(12) United States Patent
Matsui (10) Patent No.: US 10,457,166 B2
(45) Date of Patent: Oct. 29, 2019

(54) VEHICLE SEAT (71) Applicant: TACHI-S CO., LTD., Akishima-shi, Tokyo (JP)

(72) Inventor: Takashi Matsui, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 15/757,228

(22) PCT Filed: May 9, 2016

(86) PCT No.: PCT/JP2016/063782
§ 371 (c)(1),
(2) Date: Mar. 2, 2018

(87) PCT Pub. No.: WO2017/047156
PCT Pub. Date: Mar. 23, 2017

(65) Prior Publication Data
US 2018/0244176 A1 Aug. 30, 2018

(30) Foreign Application Priority Data
Sep. 16, 2015 (JP) ................... 2015-182611

(51) Int. Cl.
B60N 2/07 (2006.01)
B60N 2/30 (2006.01)
B60N 2/02 (2006.01)

(52) U.S. Cl.
CPC ............. *B60N 2/07* (2013.01); *B60N 2/0284* (2013.01); *B60N 2/30* (2013.01); *B60N 2/3013* (2013.01);
(Continued)

(58) Field of Classification Search
CPC ......... B60N 2/305; B60N 2/3075; B60N 2/07
See application file for complete search history.

(56) References Cited

U.S. PATENT DOCUMENTS 5,158,338 A * 10/1992 Hayakawa ......... B60N 2/01591
297/335
5,671,948 A * 9/1997 Susko .................. B60N 2/3047
280/801.1
(Continued)

FOREIGN PATENT DOCUMENTS

JP H03-125628 U 12/1991
JP 2006-321483 A 11/2006
JP 2015-009733 A 1/2015

OTHER PUBLICATIONS

International Search Report from International Patent Application No. PCT/JP2016/063782, dated Aug. 2, 2016.

*Primary Examiner* — Timothy J Brindley
(74) *Attorney, Agent, or Firm* — Shapiro, Gabor and Rosenberger, PLLC (57) ABSTRACT

An object of the present invention is to provide a vehicle seat in which a vacant space produced after tipping up a seat cushion can be effectively used as a luggage storage space. The vehicle seat includes: a support leg (6A, 6B, 6C) to support weight related to a seat cushion (2); a leg holding member (8) to hold a lower part (6C) of the support leg (6A, 6B, 6C); and a slide mechanism (18A, 18B) to move the seat cushion (2) and a seat back (3) in a front/back direction. The seat has a tip-up function to rotate the seat cushion (2) so that its front part is in a higher position than its rear part and the seating surface of the seat cushion (2) and the front surface of the seat back (3) face each other, in which the leg holding member (8) is located at a part (18A) of the slide mechanism (18A, 18B) which moves along with the seat cushion (2) and the seat back (3).

9 Claims, 9 Drawing Sheets (52) U.S. Cl.
CPC ......... *B60N 2/3047* (2013.01); *B60N 2/3075* (2013.01); *B60N 2002/0212* (2013.01)

(56) References Cited

U.S. PATENT DOCUMENTS

| | | | | |
|---|---|---|---|---|
| 6,742,841 | B1* | 6/2004 | Soditch | A47C 7/56 |
| | | | | 297/335 |
| 10,040,378 | B2* | 8/2018 | Hansen | B60N 2/3075 |
| 2002/0125753 | A1* | 9/2002 | Kammerer | B60N 2/0292 |
| | | | | 297/331 |
| 2006/0267390 | A1* | 11/2006 | Epaud | B60N 2/242 |
| | | | | 297/313 |
| 2013/0025388 | A1* | 1/2013 | Flieger | B60N 2/067 |
| | | | | 74/89.23 |
| 2013/0075571 | A1* | 3/2013 | Suck | B60N 2/072 |
| | | | | 248/430 |
| 2014/0117699 | A1* | 5/2014 | Zeimis, III | B60N 2/3011 |
| | | | | 296/65.05 |
| 2015/0021958 | A1* | 1/2015 | Fukutani | B60N 2/06 |
| | | | | 297/16.1 |
| 2015/0202998 | A1* | 7/2015 | Komatsubara | B60N 2/68 |
| | | | | 297/216.1 |
| 2015/0306980 | A1* | 10/2015 | Furuta | B60N 2/072 |
| | | | | 248/429 |
| 2016/0046210 | A1* | 2/2016 | Nakamura | B60N 2/065 |
| | | | | 297/344.1 |
| 2016/0059739 | A1* | 3/2016 | Tsuji | B60N 2/0705 |
| | | | | 248/429 |
| 2016/0144748 | A1 | 5/2016 | Akutsu | |
| 2017/0313215 | A1* | 11/2017 | Akutsu | B60N 2/30 |
| 2017/0368966 | A1* | 12/2017 | Jensen | B60N 2/22 |

\* cited by examiner

VEHICLE SEAT

TECHNICAL FIELD

The present invention relates to a vehicle seat which is used in a vehicle.

BACKGROUND ART

Japanese Patent Application Laid-Open No. 2015-009733 (Patent Literature 1) describes a vehicle seat which can store a seat back and a seat cushion connected to the seat back on a storage floor made in a lower position than a vehicle body floor and includes: a support base provided on the vehicle body floor, located under the seat cushion, and connected to the lower end of the seat back in a rotatable manner; a support leg with an upper end fitted to the seat cushion and a lower end connected to the support base; a leg holding member fitted to the support base to hold the lower end of the support leg in an attachable/detachable manner; and a lock device which is fitted in the vehicle seat and can lock the support leg held by the leg holding member (see the claims).

CITATION LIST

Patent Literature

PTL 1: Japanese Patent Application Laid-Open No. 2015-009733

SUMMARY OF INVENTION

Technical Problem

In the vehicle seat described in PTL 1, the leg holding member which holds the lower end of the support leg in an attachable/detachable manner is located in the center of the vehicle seat in the width direction of the vehicle seat. Therefore, the support base for fitting the leg holding member is needed. In a tipped-up state in which the front part of the seat cushion is in a higher position than its rear part, the vacant space produced after tipping up the seat cushion (the space occupied by the seat cushion in a seating state and the space under the seat cushion in the seating state) is expected to be usable as a luggage storage space. However, in the structure in which the leg holding member is located in the center of the vehicle seat in the width direction, the leg holding member and the support base are located in the vacant space produced after tipping up the seat cushion and thus this vacant space cannot be effectively used as a luggage storage space.

An object of the present invention is to provide a vehicle seat in which a vacant space produced after tipping up a seat cushion can be effectively used as a luggage storage space.

Solution to Problem

In order to achieve the above object, a vehicle seat according to the present invention includes: a seat cushion for a person to sit on; a seat back erected at a rear end of the seat cushion; a support leg provided on the seat cushion to support weight related to the seat cushion; a leg holding member to hold a lower part of the support leg; and a slide mechanism to move the seat cushion and the seat back in a front/back direction; and the vehicle seat has a tip-up function to rotate the seat cushion so that its front part is in a higher position than its rear part and the seating surface of the seat cushion and the front surface of the seat back face each other, in which the leg holding member is located at a part of the slide mechanism which moves along with the seat cushion and the seat back.

Advantageous Effects of Invention

According to the present invention, there is provided a vehicle seat in which a vacant space produced after tipping up a seat cushion can be effectively used as a luggage storage space.

DESCRIPTION OF EMBODIMENTS

Next, an embodiment of the present invention will be described. In the description below, front/back direction means the front/back direction of the vehicle; width direction means the width direction of the vehicle or vehicle seat (the same direction for both); right/left direction means the right/left direction of the vehicle when the viewer sees forward of the vehicle (when the viewer sits on the vehicle seat); and up/down direction means the vertical direction of the vehicle placed in a horizontal position. The right/left direction is the same as the width direction of the vehicle or vehicle seat. In the figures, sign F indicates that the arrow shows the forward direction of the vehicle and sign R indicates that the arrow shows the rearward direction of the vehicle. Moreover, sign r indicates that the arrow shows the rightward direction of the vehicle and sign 1 indicates that the arrow shows the leftward direction of the vehicle.

In the description below, when the vehicle seat 1 is set to enable a person to get seated, this is referred to as the state set in a seating position.

Next, an embodiment of a vehicle seat 1 according to the present invention will be described.

Figure 1:
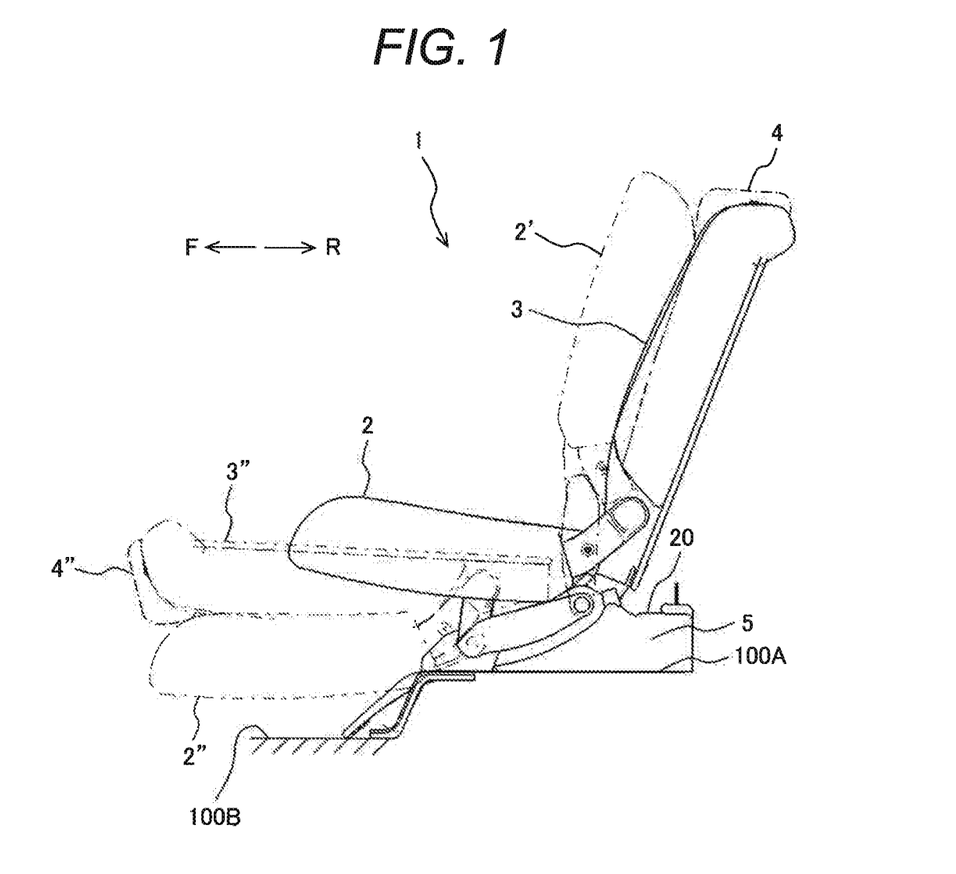
FIG. 1 is a side view which shows a vehicle seat 1 according to an embodiment of the present invention which is set in a seating position, in a tipped-up state, and in a dived-down state.

FIG. 1 is a side view which shows the vehicle seat 1 according to an embodiment of the present invention which is set in a seating position, in a tipped-up state, and in a dived-down state.

As shown in FIG. 1, the vehicle seat 1 includes: a seat cushion 2 for a person to sit on; a seat back 3 erected at the rear end of the seat cushion 2; and a head rest 4 provided at the upper end of the seat back 3. The vehicle seat 1 is fixed on the floor of the vehicle (vehicle floor) by a support base 5. The support base 5 has a slide mechanism so that the seat cushion 2, seat back 3 and head rest 4 can slide integrally in the front/back direction of the vehicle.

The seat cushion 2 can be tipped up so that its front part is in a higher position than its rear part. In FIG. 1, the seat cushion in the tipped-up state is indicated by chain line 2'.

The seat cushion 2 can be shifted from the tipped-up state 2' to the dived-down state together with the seat back 3 and the head rest 4. In FIG. 1, the seat cushion, seat back and head rest which are in the dived-down state are indicated by chain lines 2", 3", and 4".

The seat cushion 2 and seat back 3 can be shifted from the state set in the seating position (state indicated by the solid line 2 in FIG. 1) to the dived-down state indicated by the chain lines 2", 3", and 4". In this case, in conjunction with forward fall of the seat back 3, the seat cushion 2 and seat back 3 are moved down to a vehicle floor surface (storage space) 100B lower than a vehicle floor surface A to store them on the lower vehicle floor surface 100B. When the vehicle seat 1 is in the dived-down state, the back surface of the forward-fallen seat back 3 (3") can be used as a luggage loading surface. The vehicle seat 1 which can dive down as in this embodiment may be called a dive-down seat.

Figure 2:
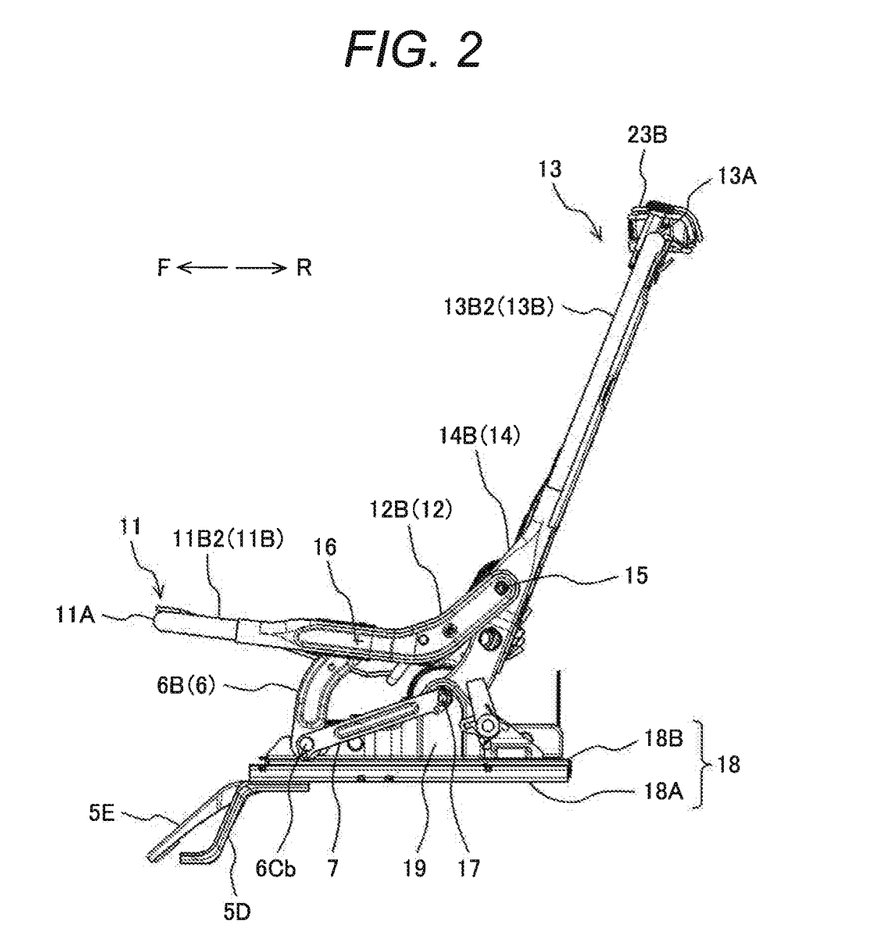
FIG. 2 is a side view which shows the frame structure of the vehicle seat 1 set in the seating position.
Figure 3:
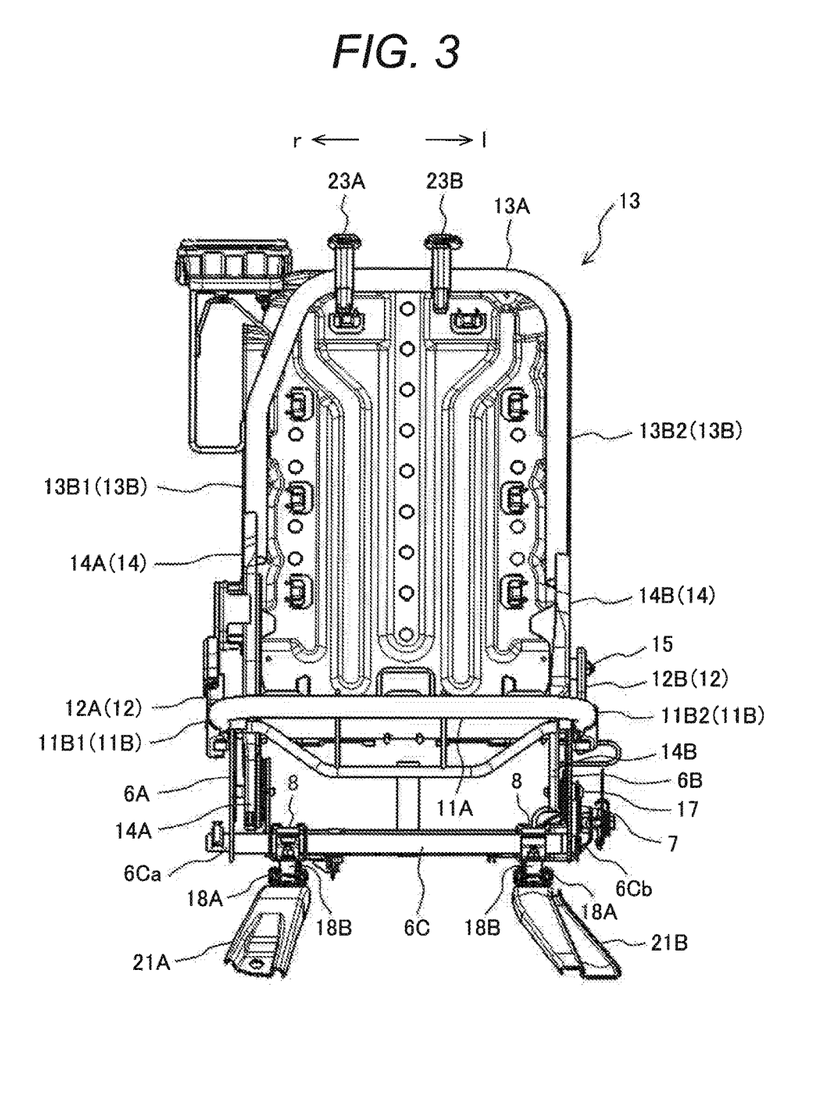
FIG. 3 is a front view which shows the frame structure of the vehicle seat 1 set in the seating position.
Figure 4:
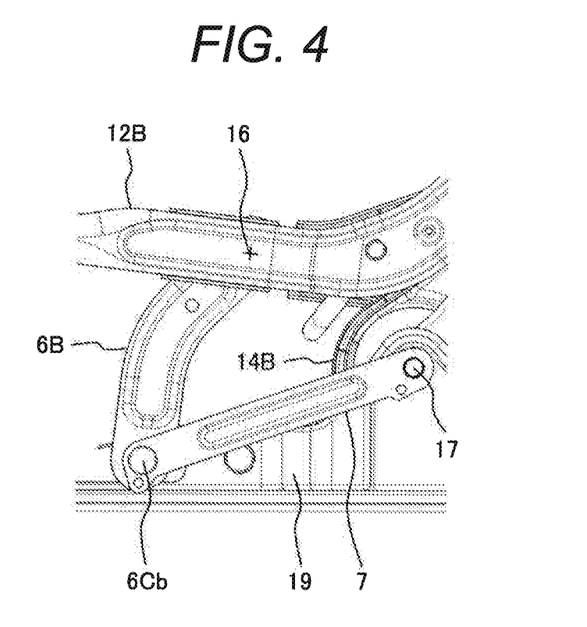
FIG. 4 is a side view which shows the vicinity of the support leg 6B and link member 7 of the vehicle seat 1 as shown in FIG. 2 in enlarged form.
Figure 5:
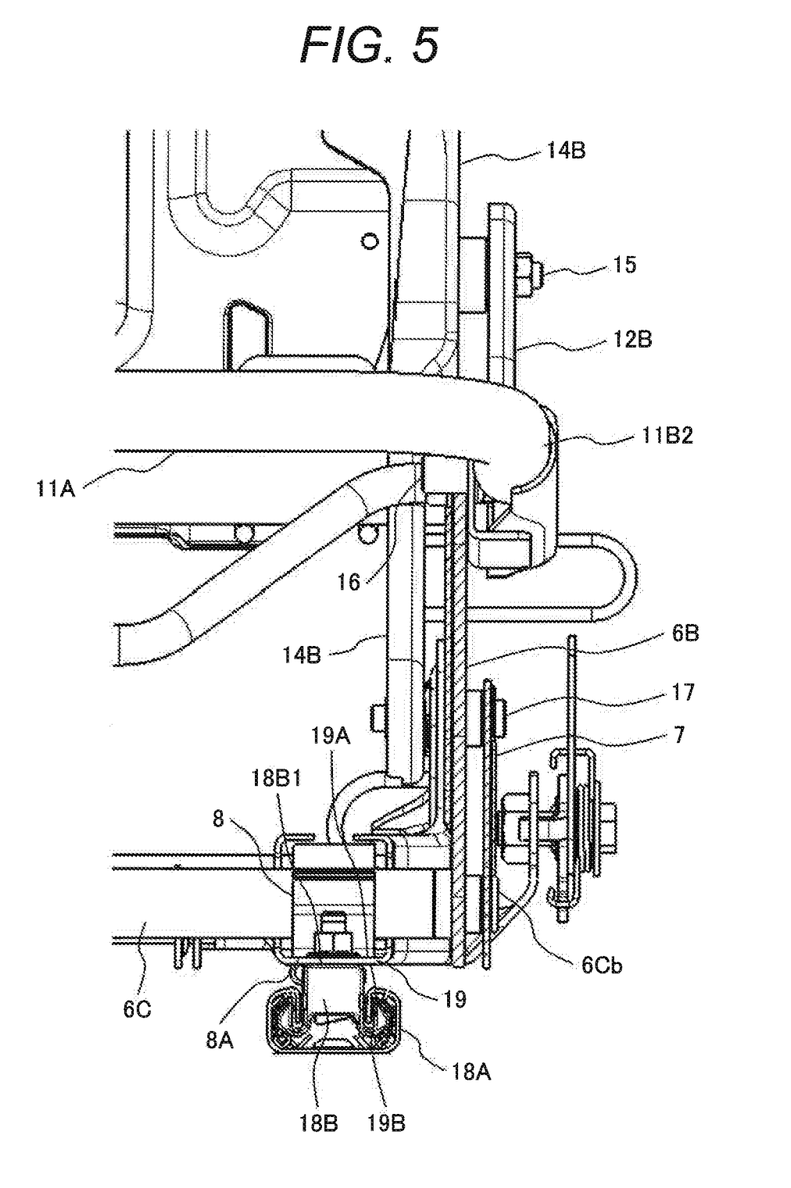
FIG. 5 is a front view which shows the vicinity of the support leg 6B of the vehicle seat 1 as shown in FIG. 3 in enlarged form.

Next, the frame structure of the vehicle seat 1 will be described referring to FIGS. 2 to 5. FIG. 2 is a side view which shows the frame structure of the vehicle seat 1 set in the seating position. FIG. 3 is a front view which shows the frame structure of the vehicle seat 1 set in the seating position. FIG. 4 is a side view which shows the vicinity of the support leg 6B and link member 7 of the vehicle seat 1 as shown in FIG. 2 in enlarged form. FIG. 5 is a front view which shows the vicinity of the support leg 6B of the vehicle seat 1 as shown in FIG. 3 in enlarged form.

In the vehicle seat 1, a cushion material and a cover member are provided so as to cover the frame members of the seat cushion 2, seat back 3 and head rest 4. FIGS. 2 to 9 show the frame structure in a state in which the cushion material and cover member are removed from the seat cushion 2, seat back 3, and head rest 4. FIG. 1 shows a state in which the cushion material and cover member are provided on the seat cushion 2, seat back 3 and head rest 4.

The seat cushion frame 11 of the seat cushion 2 is formed from a pipe material. With the seat cushion 2 set in the seating position, the seat cushion frame 11 has a front edge part 11A extending in the right/left direction at the front part of the seat cushion 2 and side edge parts 11B extending rearward from both ends of the front edge part 11A. The side edge parts 11B include a right side edge part 11B1 (see FIG. 3) extending rearward from the right end of the front edge part 11A and a left side edge part 11B2 (see FIGS. 2 and 3) extending rearward from the left end of the front edge part 11A.

The rear ends of the side edge parts 11B of the seat cushion frame 11 are connected and fixed to hinge parts 12. The hinge parts 12 include a right hinge part 12A (see FIG. 3) provided on the right side edge part 11B1 of the seat cushion frame 11 and a left hinge part 12B (see FIGS. 2 and 3) provided on the left side edge part 11B2 of the seat cushion frame 11. The hinge parts 12 are formed from a bended plate material. The hinge parts 12 may be considered as components which constitute part of the frame of the seat cushion 2.

The seat back frame 13 of the seat back 3 is formed from a pipe material. With the seat back 3 set in the seating position, the seat back frame 13 has an upper edge part 13A extending in the right/left direction at the top and side edge parts (drooping parts) 13B extending downward from both ends of the upper edge part 13A. The side edge parts 13B include a right side edge part 13B1 (see FIG. 3) extending downward from the right end of the upper edge part 13A and a left side edge part 13B2 (see FIGS. 2 and 3) extending downward from the left end of the upper edge part 13A.

Hinge parts 14 are connected and fixed to the lower ends of the side edge parts 13B of the seat back frame 13. The hinge parts 14 include a right hinge part 14A (see FIG. 3) provided on the right side edge part 13B1 of the seat back frame 13 and a left hinge part 14B (see FIGS. 2 and 3) provided on the left side edge part 13B2 of the seat back frame 13. The hinge parts 14 are formed from a bended plate material. The hinge parts 14 may be considered as components which constitute part of the frame of the seat back 3.

The seat cushion frame 11 and hinge parts 12 are connected to the seat back frame 13 and the hinge parts 14 in a manner to be rotatable around a rotation axis 15. Consequently, the seat cushion 2 is structured so that it can be tipped up.

A support leg 6 (6A, 6B, 6C) is connected to the hinge parts 12 of the seat cushion 2. The erect parts 6A and 6B of the support leg 6 are located so as to extend vertically with the seat cushion 2 set in the seating position. The lower end of the erect part 6A and the lower end of the erect part 6B are connected to a connecting member 6C extending in the right/left direction.

The upper end of the erect part 6A is connected to the right hinge part 12A of the seat cushion 2. The upper end of the erect part 6B is connected to the left hinge part 12B of the seat cushion 2. The erect part 6B is connected to the left hinge part 12B in a manner to be rotatable around a rotation axis provided at the point indicated by reference sign 16 in FIG. 2. The erect part 6A is connected to the right hinge part 12B in a manner to be rotatable around a rotation axis provided at a position corresponding to the rotation axis 16 of the left hinge part 12B.

The connecting member 6C is formed from a pipe material and has a large-diameter portion in the center and small-diameter portions 6Ca and 6Cb with a smaller diameter than the center portion at the both ends of the connecting member 6C. The erect parts 6A and 6B are plate-like members and have openings through which the small-diameter portions 6Ca and 6Cb of the connecting member 6C pass through. The small-diameter portions 6Ca and 6Cb of the horizontal part 6B pass through the erect parts 6A and 6B and protrude outward of the erect parts 6A and 6B.

One end of a link member 7 is connected to the small-diameter part 6Cb of the connecting member 6C which protrudes outward of the erect part 6B. The link member 7 is designed to be rotatable with respect to the support leg 6 with the small-diameter part 6Cb as the rotation axis (rotation center). The other end of the link member 7 is connected to a rotation axis 17 fixed with respect to the support base 5 so that the link member 7 is rotatable around the rotation axis 17 with respect to the support base 5. The rotation axis 17 is located rearward and upward of the small-diameter part 6Cb.

The left hinge part 14B of the seat back 3, the erect part 6B of the support leg 6, and the link member 7 are arranged outward from the inside of the vehicle seat 1 in the order of mention. The rotation axis 16 of the erect part 6B is located inside the left hinge part 14B. Due to this structure, the left hinge part 14B, erect part 6B, and link member 7 can rotate without interfering with each other and the components can be arranged in a compact manner.

In this embodiment, since the rotation axis of the link member 7 is the small-diameter part 6Cb of the connecting member 6C, the number of components is decreased and a simple structure is realized.

Head rest frames 23A and 23B are fitted to the upper end of the seat back frame 13 of the seat back 3.

The support base 5 has a slide rail device 18 which includes a lower rail 18A and an upper rail 18B. The lower rail 18A is fixed on the vehicle floor 100A. The upper rail 18B is designed to be slidable with respect to the lower rail 18A in the front/back direction. The slide rail device 18 is a slide mechanism to slide the vehicle seat 1 in the front/back direction.

One slide rail device 18 is provided on each of the right and left sides of the vehicle seat 1. Of the left and right slide rail devices 18, the slide rail device 18 located inward in the vehicle room may be called the inner slide rail device 18 and the slide rail device 18 located outward in the vehicle room may be called the outer slide rail device 18.

A seat riser 19 is fitted to the upper rail 18B of the slide rail device 18. The seat riser 19 is part of the base 5 and formed by bending a plate-like metal member. The seat riser 19 is a holding member (support member) to hold or support the vehicle seat 1 with a tip-up function and a dive-down function, and the seat back 3 is fitted over the seat riser 19. In this embodiment, the lower end of the hinge part 14 of the seat back 3 is connected to the rotation axis 17 and the seat back frame 13 and hinge part 14 of the seat back 3 are fitted to the seat riser 19 in a manner to be rotatable around the rotation axis 17.

The position of the rotation axis 17 is fixed with respect to the seat riser 19. The rotation axis 17 is a rotation axis connected to the other end of the link member 7 and functions as both a connecting part of the link member 7 and a connecting part of the hinge part 14 of the seat back 3. Since one rotation axis functions as rotation centers for two or more rotating members, a simple structure can be realized.

The slide rail device 18, seat riser 19 and so on of the support base 5 are covered by a resin cover 20 (see FIG. 1).

The front part of the lower rail 18A of the slide rail device 18 is fixed on the vehicle floor 100B by fittings 21A and 21B. The fitting 21A fixes the right slide rail device 18 on the vehicle floor 100B and the fitting 21B fixes the left slide rail device 18 on the vehicle floor 100B.

A leg holding member (catcher) 8 for fixing the support leg 6 in an attachable/detachable manner is fitted to the upper rail 18B of the slide rail device 18. With the seat cushion 2 set in the seating position, the connecting member 6C of the support leg 6 is engaged with the leg holding member 8.

Next, tip-up motion and dive-down motion of the vehicle seat 1 will be described referring to FIGS. 6 to 8.

Figure 6:
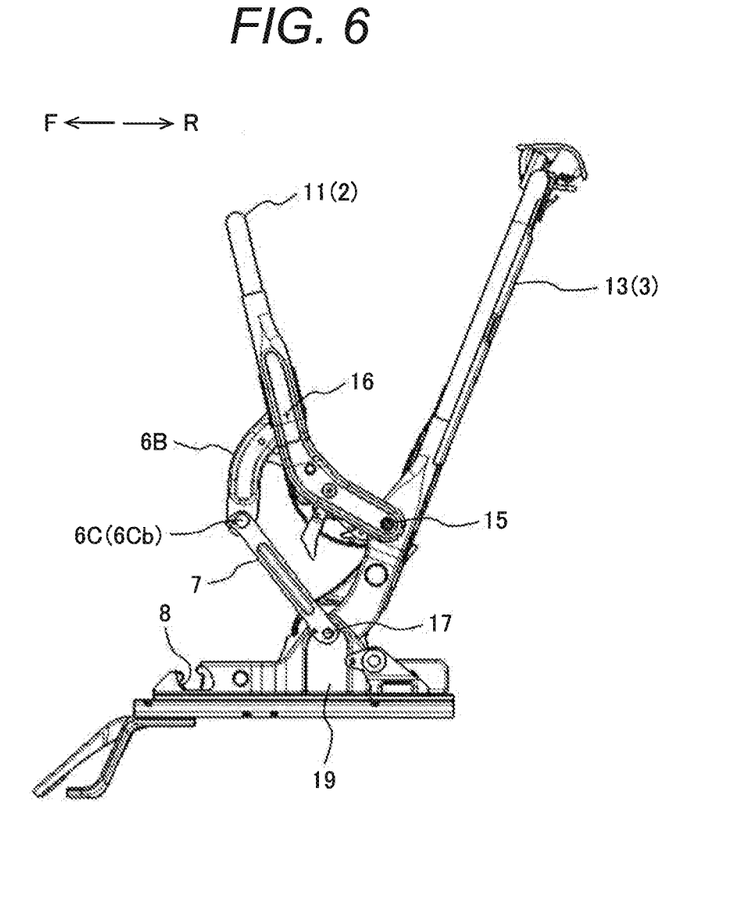
FIG. 6 is a side view which shows the frame structure of the vehicle seat 1 in transition from the seating position to the tipped-up state.

FIG. 6 is a side view which shows the frame structure of the vehicle seat 1 in transition from the seating position to the tipped-up state. FIG. 7 is a side view which shows the frame structure of the vehicle seat 1 in the tipped-up state. FIG. 8 is a side view which shows the frame structure of the vehicle seat 1 set in the seating position (solid line), in the tipped-up state (chain line) and in the dived-down state (chain line).

The state shown in FIG. 6 is a transitional state of the seat cushion 3 which is being tipped up by raising the front part of the seat cushion frame 11 (seat cushion 3) in the state shown in FIG. 2 (seating position) so as to put it in a higher position than the rear part (part for connection to the rotation axis 15). The connecting member 6C of the support leg 6 is released from the leg holding member 8 by raising the front part of the seat cushion 3.

Since the link member 7 is connected to the small-diameter part 6Cb of the connecting member 6C, the erect parts 6A and 6B of the support leg 6 rotate around the rotation axis 16 and change their posture with respect to the seat cushion frame 11. In other words, the connecting member 6C comes closer to the seat cushion frame 11 and the erect parts 6A and 6B change their posture along the seat cushion frame 11.

At this time, the link member 7 rotates around the rotation axis 17, and the erect part 6B and link member 7 rotate around the small-diameter part 6Cb reciprocally to change their positional relation.

Figure 7:
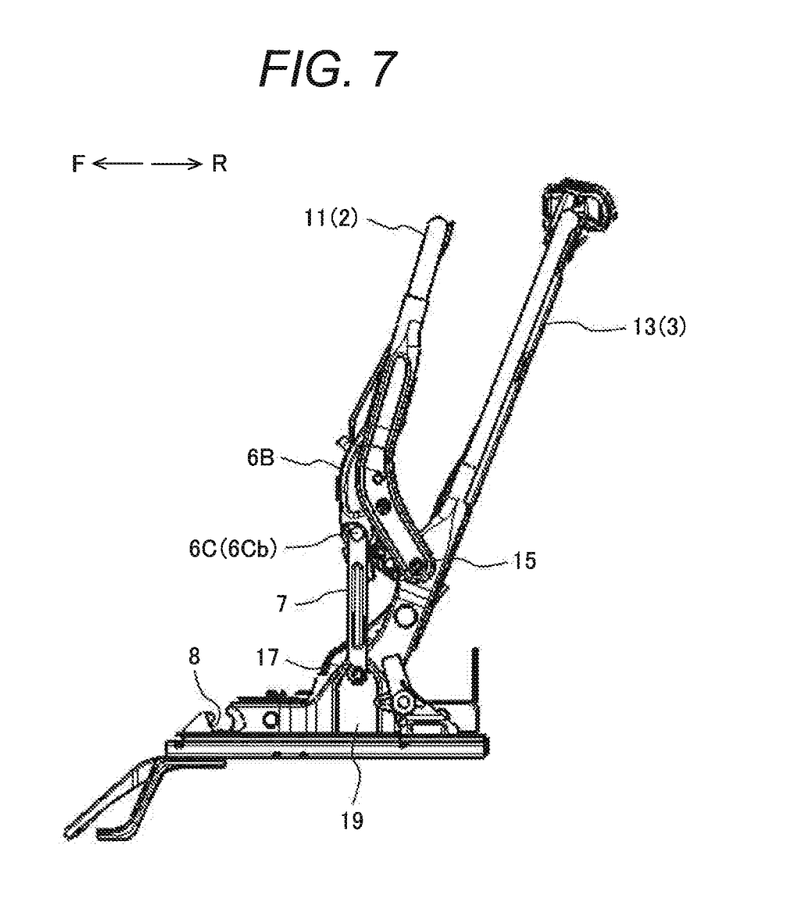
FIG. 7 is a side view which shows the frame structure of the vehicle seat 1 in the tipped-up state.

The state shown in FIG. 7 is a state in which tip-up motion is completed. In the state in which tip-up motion is completed, the seat cushion frame 11 and seat back frame 13 are almost parallel and the seat surface of the seat cushion 2 and the front surface of the seat back 3 face and are in contact each other.

Moreover, in the state in which tip-up motion is completed, the erect parts 6A and 6B of the support leg 6 are positioned along the seat cushion frame 11 so that their longitudinal side is located almost in the up/down direction (vertical direction) with their connection with the rotation axis 16 up and their connection with the connecting member 6C down. At this time, the link member 7 is positioned so that its longitudinal side is located almost in the up/down direction (vertical direction) with its connection with the connecting member 6C up and its connection with the rotation axis 17 down.

In the plan view of FIG. 7, one side edge part of the erect parts 6A and 6B (seat cushion frame 11 side) is in a position to overlap the seat cushion frame 11. That is, when the vehicle seat 1 is viewed sideways, one side edge part of the erect parts 6A and 6B (seat cushion frame 11 side) is in a position to overlap the seat cushion frame 11. At this time, the erect parts 6A and 6B of the support leg 6 are changed from an erect state with respect to the seat cushion frame 11 (state shown in FIG. 2) to a state in which they are stored in a storage space formed on the undersurface of the seat cushion (state shown in FIG. 7).

The link member 7 is a member intended to shift the erect parts 6A and 6B of the support leg 6 to the storage state in conjunction with tip-up motion of the seat cushion 3 and the link member 7 has only to be provided on one of the right and left erect parts 6A and 6B.

Figure 8:
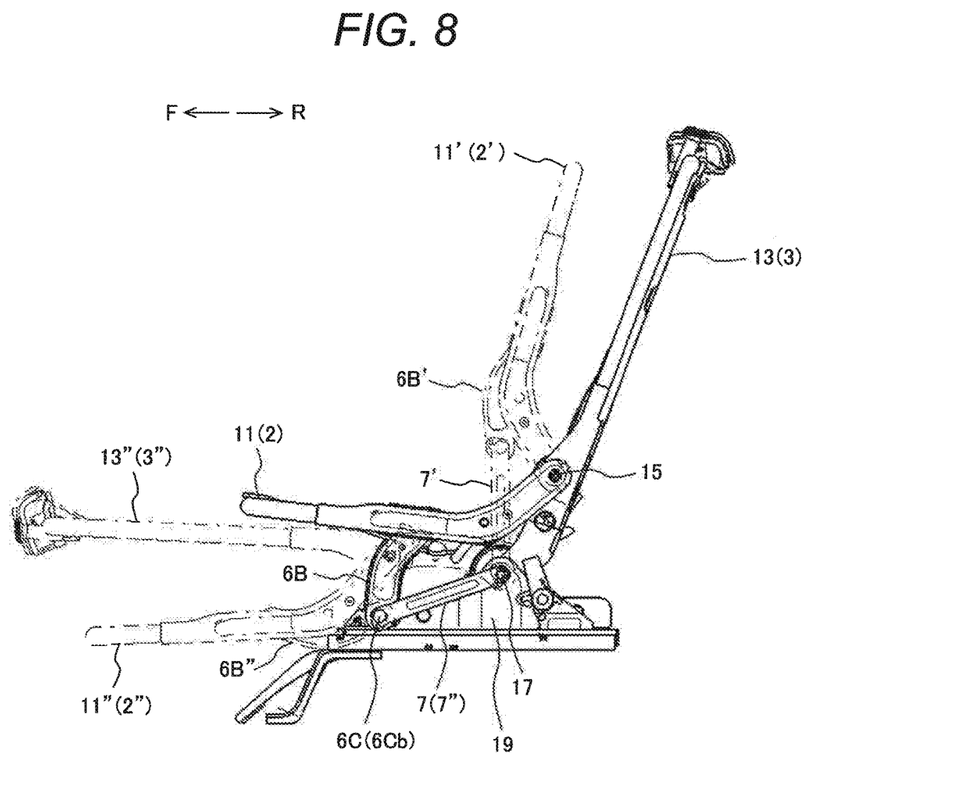
FIG. 8 is a side view which shows the frame structure of the vehicle seat 1 set in the seating position (solid line), in the tipped-up state (chain line) and in the dived-down state (chain line).

In FIG. 8, the seat cushion frame 11 (seat cushion 2), the erect part 6B of the support leg 3, and the link member 7 which are in the tipped-up state are indicated by reference signs 11' (2'), 6B' and 7' respectively, and the seat cushion frame 11 (seat cushion 2), the seat back frame 13 (seat back 3), the erect part 6B of the support leg 3, and the link member 7 which are in the dived-down state are indicated by reference signs 11" (2"), 13" (3"), 6B" and 7" respectively.

The seat cushion frame 11" (seat cushion 2"), the erect part 6B" of the support leg 3, and the link member 7" which have dived down maintain their positional relation with the seat cushion frame 11' (seat cushion 2'), the erect part 6B' of the support leg 3, and the link member 7' which have been tipped up. The connecting member 6C of the support leg 6 is engaged with the leg holding member 8 and its relative position with respect to the seat riser 19 is fixed.

In this embodiment, the support leg 6 is automatically stored in the storage space formed on the undersurface of the seat cushion 2 in conjunction with tip-up motion of the seat cushion 2. Therefore, operation to store the support leg 6 after tip-up motion is not needed.

When the seat cushion 2 in the tipped-up state is restored to the seating position, the support leg 6 stored in the storage space is automatically moved and reset to the state in which it is erect on the undersurface of the seat cushion 2. Alternatively, when the seat cushion 2 and seat back 3 in the dived-down state are restored to the seating position, the support leg 6 is also automatically moved. Therefore, when the vehicle seat 1 in the tipped-up state or the dived-down state is restored to the seating position, operation to move the support leg 6 is not needed.

In this embodiment, operation to store or move the support leg 6 is not needed and the number of operations to change the seat arrangement can be decreased. Consequently, the vehicle seat 1 with high operability can be provided.

Figure 9:
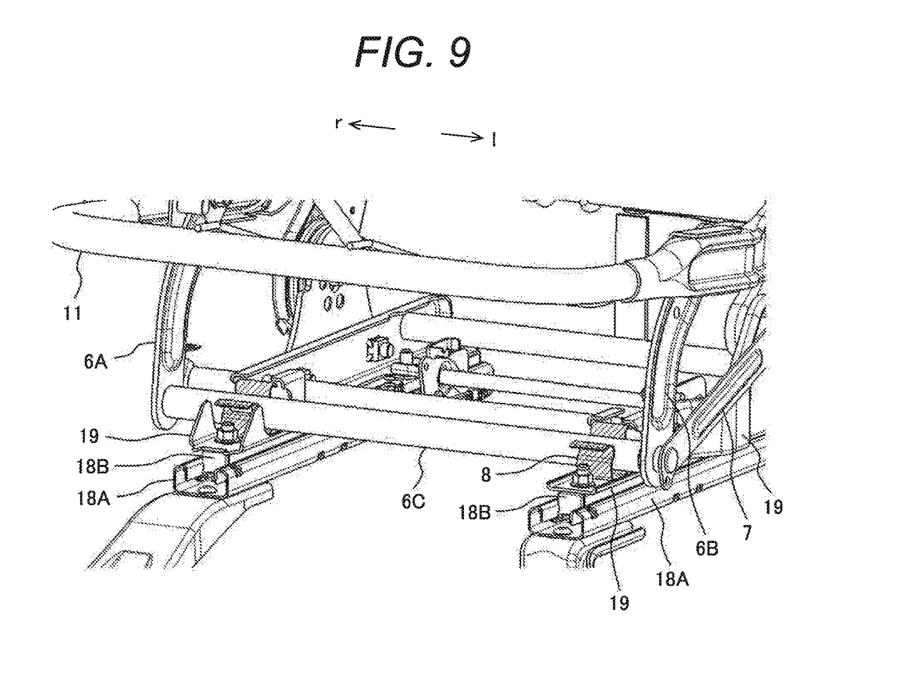
FIG. 9 is a perspective view which shows the support leg 6 held by the leg holding member 8 in the vehicle seat 1 set in the seating position.
Figure 10:
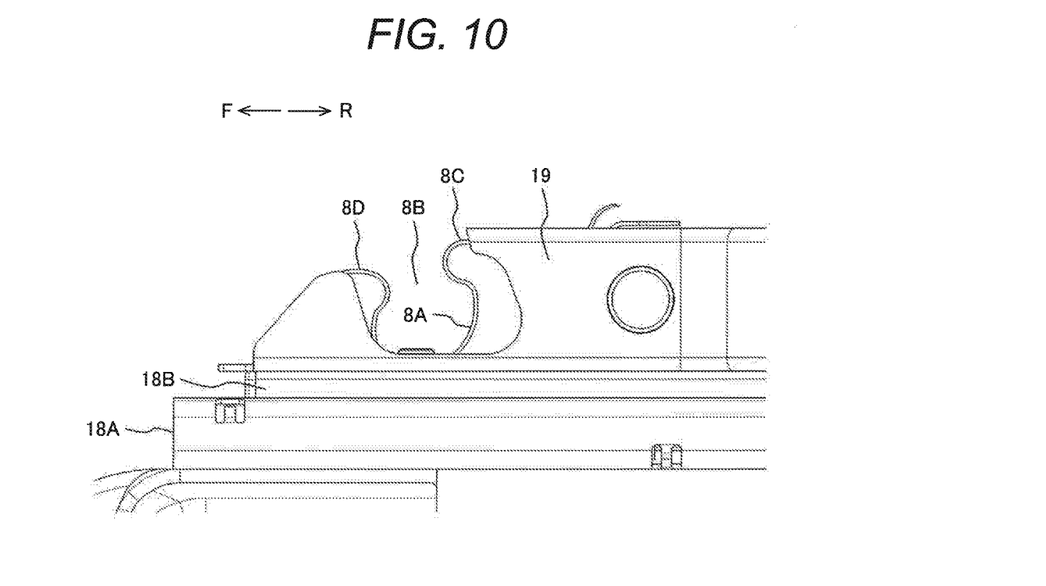
FIG. 10 is a side view which shows the vicinity of the leg holding member 8 in enlarged form.

Next, the leg holding member 8 will be described referring to FIGS. 9 and 10. FIG. 9 is a perspective view which shows the support leg 6 held by the leg holding member 8 in the vehicle seat 1 set in the seating position. FIG. 10 is a side view which shows the vicinity of the leg holding member 8 in enlarged form. In FIG. 9, the leg holding member 8 is shown with part (front part) of the left seat riser 19 cut.

In this embodiment, one leg holding member 8 is provided on each of the right and left seat risers 19.

As shown in FIG. 9, the seat riser 19 is fitted to the upper rail 18B and the leg holding member 8 is fixed to the seat riser 19. That is, the leg holding member 8 is fixed to the upper rail 18B through the seat riser 19.

The leg holding member 8 is formed by bending a plate-like metal. As shown in FIG. 10, the leg holding member 8 has a cross section shaped like Greek character Ω. The leg holding member 8 includes: a receptacle 8A to receive the connecting member 6C of the support leg 6; an insertion/extraction hole 8B to insert the connecting member 6C in the receptacle 8A or extract the connecting member 6C; and receiving pieces 8C and 8D to guide the connecting member 6C of the support leg 6 to the insertion/extraction hole when inserting the connecting member 6C in the receptacle 8A.

The leg holding member 8 is fixed over the seat riser 19 with the receptacle 8A down and the insertion/extraction hole 8B up. The width of the insertion/extraction hole 8B is smaller than the diameter of the connecting member 6C. The leg holding member 8 is an elastically deformable member which is formed by bending a plate-like metal. When inserting the connecting member 6C in the receptacle 8A or extracting the connecting member 6C, the leg holding member 8 is elastically deformed so as to expand the width of the insertion/extraction hole 8B and after the connecting member 6C is received in the receptacle 8A, the leg holding member 8 is restored to its original shape (width of the insertion/extraction hole 8B).

The leg holding member 8 receives a large weight when a person is seated on the vehicle seat 1. Therefore, a member which supports the leg holding member 8 must have high rigidity and high strength. The slide rail device 18 having the upper rail 18B, and the seat riser 19 have high rigidity and high strength to receive the weight of the seated person. In this embodiment, since the slide rail device 18 and seat riser 19 are used as supporting members for the leg holding member 8, high rigidity and high strength of the supporting members for the leg holding member 8 are ensured.

In order to increase the support strength and rigidity of the leg holding member 8, the leg holding member 8 is located above the upper rail 18B of the slide rail device 18 in the vertical direction. As shown in FIG. 5, the leg holding member 8 is located so that its lower surface 8A faces the upper surface 18B1 of the upper rail 18B through the seat riser 19. That is, the lower surface 8A of the leg holding member 8, the plate surfaces 19A and 19B of the plate-like seat riser 19, and the upper surface 18B1 of the upper rail 18B are located parallel to each other; the lower surface 8A of the leg holding member 8 and one plate surface (upper surface) 19A of the plate-like seat riser 19 are in contact each other; and the other surface (lower surface) 19B of the seat riser 19 and the upper surface 18B1 of the upper rail 18B are in contact each other.

Furthermore, the leg holding member 8 is located between the front end and rear end of the upper rail 18B. In particular, in this embodiment, the leg holding member 8 is located nearer to the front end of the upper rail 18B than to the rear end of the upper rail 18B.

In addition, since the slide rail device 18 and seat riser 19 are used as supporting members for the leg holding member 8, it is unnecessary to provide an additional supporting member with high rigidity and high strength and a simple structure can be realized.

In addition, since the leg holding member 8 is located over the slide rail device 18 and seat riser 19, the leg holding member 8 and a supporting member for it need not be located between the right and left slide rail devices 18. Therefore, the space between the right and left slide rail devices 18 can be effectively used as a luggage storage space.

In this embodiment, one leg holding member 8 is provided on each of the right and left seat risers 19 (or slide rail devices 18) and a total of two leg holding members 8 are provided. If either one of the leg holding members 8 located right and left can provide the required strength, only one leg holding member 8 may be provided.

In this embodiment, since the leg holding member 8 is located on the seat riser 19 (or slide rail device 18), the leg holding member 8 holds the connecting member 6C of the support leg 6 in a one-sided position in the right/left direction. Therefore, if only one leg holding member 8 is provided, the strength of the leg holding member 8 to support the support leg 6 must be increased. In contrast, if two leg holding members 8 are provided, the strength of one leg holding member 8 to support the support leg 6 can be decreased.

REFERENCE SIGNS LIST

1 . . . vehicle seat,
2, 2', 2" . . . seat cushion,
3, 3" . . . seat back,
4, 4" . . . head rest,
5 . . . support base,
6 . . . support leg,
6A . . . right erect part of the support leg 6,
6B, 6B', 6B" . . . left erect part of the support leg 6,
6C . . . connecting member of the support leg 6,
16 . . . rotation axis, 6Ca, 6Cb . . . small-diameter portion of the connecting member 6C,
7, 7', 7" . . . link member,
8 . . . leg holding member (catcher),
8A . . . receptacle,
8B . . . insertion/extraction hole,
8C, 8D . . . receiving piece,
11, 11', 11" . . . seat cushion frame,
11A . . . front edge part of the seat cushion frame 11,
11B . . . side edge part of the seat cushion frame 11,
11B1 . . . right side edge part,
11B2 . . . left side edge part,
12 . . . hinge part of the seat cushion 2,
12A . . . right hinge part,
12B . . . left hinge part,
13, 13" . . . seat back frame,
13A . . . upper edge part of the seat back frame 13,
13B . . . side edge part (drooping part) of the seat back frame 13,
13B1 . . . right side edge part,
13B2 . . . left side edge part,
14 . . . hinge part of the seat back 3,
14A . . . right hinge part,
14B . . . left hinge part,
15 . . . rotation axis,
16 . . . rotation axis,
17 . . . rotation axis,
18 . . . slide rail device (slide mechanism),
18A . . . lower rail,
18B . . . upper rail,
18 . . . slide rail device,
19 . . . seat riser,
20 . . . resin cover,
21A, 21B . . . fitting,
23A, 23B . . . head rest frame,
100A . . . vehicle floor surface,
100B . . . lower vehicle floor surface (storage space).

The invention claimed is:

1. A vehicle seat comprising:
a seat cushion for a person to sit on;
a seat back erected at a rear end of the seat cushion;
a support leg provided on the seat cushion to support weight related to the seat cushion;
a respective slide mechanism located at each of a left side part and a right side part of the vehicle seat to move the seat cushion and the seat back along a front/back direction,
the vehicle seat having a tip-up function to rotate the seat cushion so that a front part of the seat cushion is in a higher position than a rear part of the seat cushion and a seating surface of the seat cushion and a front surface of the seat back face each other, wherein
the support leg has a right erect part, a left erect part and a connecting member,
the right erect part and the left erect part are provided on right and left sides of the seat cushion and are located so as to extend along an upward/downward direction with the seat cushion set in the seating position,
the connecting member extends along a right/left direction and connects a lower end of the right erect part and a lower end of the left erect part,
a respective leg holding member is located on a part of each of the slide mechanisms which moves along with the seat cushion and the seat back, the leg holding member being disposed to hold the connecting member of the support leg between the right erect part and the left erect part.

2. The vehicle seat according to claim 1, wherein
each of the slide mechanisms is a slide rail device having a lower rail and an upper rail, and
the respective leg holding member is located on the upper rail.

3. The vehicle seat according to claim 2, further comprising:
a seat riser located over the upper rail to hold the seat cushion and the seat back, wherein
the respective leg holding member is located on the upper rail by being fitted to an intervening part of the seat riser.

4. The vehicle seat according to claim 3, wherein the respective leg holding member is located between a front end and a rear end of the upper rail.

5. The vehicle seat according to claim 4, wherein
the respective leg holding member is located so that a lower surface of the leg holding member faces an upper surface of the upper rail through the seat riser, the lower surface of the respective leg holding member and an upper plate surface of the seat riser are in contact with each other, and a lower surface of the seat riser and the upper surface of the upper rail are in contact with each other.

6. The vehicle seat according to claim 5, wherein, at each of the right side part and the left side part of the vehicle seat, the seat riser is a plate-like member and the lower surface of the respective leg holding member, the upper plate surface of the seat riser, and the upper surface of the upper rail are parallel to each other.

7. A vehicle seat comprising:
a seat cushion for a person to sit on;
a seat back erected at a rear end of the seat cushion;
a support leg provided on the seat cushion to support weight related to the seat cushion;
a respective slide mechanism located at each of a left side part and right side part of the vehicle seat to move the seat cushion and the seat back along a front/back direction,
the vehicle seat having a tip-up function to rotate the seat cushion so that a front part of the seat cushion is in a higher position than a rear part of the seat cushion and a seating surface of the seat cushion and a front surface of the seat back face each other, wherein
the support leg has a right erect part, a left erect part and a connecting member,
the right erect part and the left erect part are provided on right and left sides of the seat cushion and are located so as to extend along an upward/downward direction with the seat cushion set in the seating position,
the connecting member extends along a right/left direction and connects a lower end of the right erect part and a lower end of the left erect part,
a respective leg holding member is located on a part of at least one of the slide mechanisms which moves along with the seat cushion and the seat back, the leg holding member being disposed to hold the connecting member of the support leg between the right erect part and the left erect part,
a support base which supports the slide mechanisms is provided on the floor of the vehicle and fixes the vehicle seat to the floor of the vehicle,
a link member is provided having a first end rotatably connected to the support leg and a second end rotatably connected to the support base, and
a rotation axis for the first end of the link member is provided by the connecting member of the support leg.

8. The vehicle seat according to claim 7, wherein
when the seat cushion is shifted to a tipped-up state so that its front part is in a higher position than its rear part,
the support leg is automatically stored in a storage space formed at an underside of the seat cushion.

9. A vehicle seat comprising:
a seat cushion for a person to sit on;
a seat back erected at a rear end of the seat cushion;
a support leg provided on the seat cushion to support weight related to the seat cushion;
a respective slide mechanism located at each of a left side part and a right side part of the vehicle seat to move the seat cushion and the seat back along a front/back direction,
the vehicle seat having a tip-up function to rotate the seat cushion so that a front part of the seat cushion is in a higher position than a rear part of the seat cushion and a seating surface of the seat cushion and a front surface of the seat back face each other, wherein
the support leg has a right erect part, a left erect part and a connecting member,
the right erect part and the left erect part are provided on right and left sides of the seat cushion and are located so as to extend along an upward/downward direction with the seat cushion set in the seating position,
the connecting member extends along a right/left direction and connects a lower end of the right erect part and a lower end of the left erect part, and
a respective leg holding member is located on a part of at least one of the slide mechanisms which moves along with the seat cushion and the seat back, the leg holding member being disposed to hold the connecting member of the support leg between the right erect part and the left erect part, and wherein
when the seat back and the seat cushion are shifted to a dived-down state in conjunction with forward fall of the seat back,
the connecting member of the support leg is engaged with the leg holding member.

* * * * *